May 3, 1966 E. E. FRANCISCO, JR 3,248,943
TURBINE FLOW METER
Filed Jan. 23, 1961
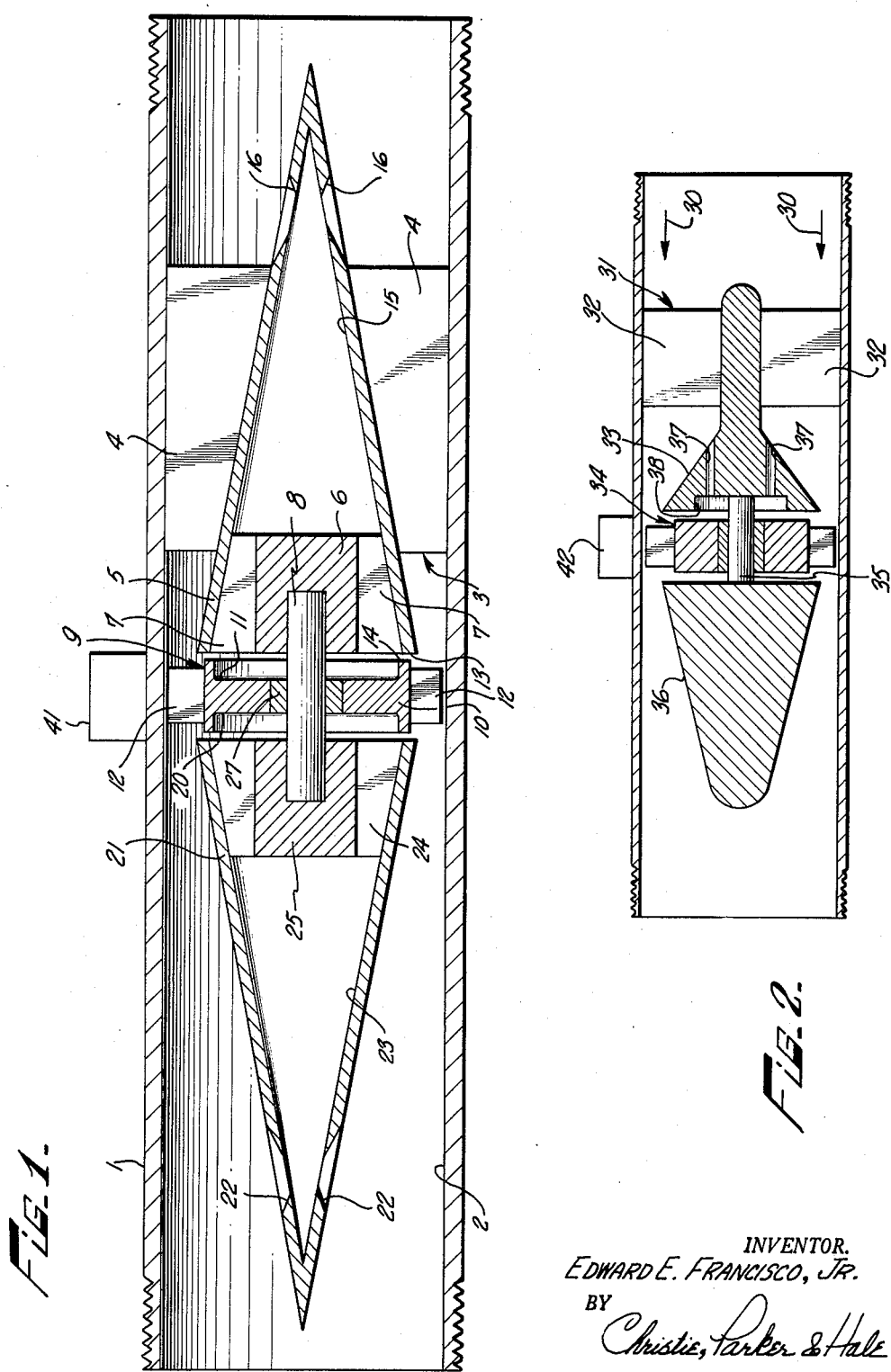
INVENTOR.
EDWARD E. FRANCISCO, JR.
BY
Christie, Parker & Hale
ATTORNEYS.

United States Patent Office 3,248,943
Patented May 3, 1966

3,248,943
TURBINE FLOW METER
Edward E. Francisco, Jr., Woodland Hills, Calif., assignor, by mesne assignments, to Emerson Electric Co., St. Louis, Mo., a corporation of Missouri
Filed Jan. 23, 1961, Ser. No. 84,230
6 Claims. (Cl. 73—231)

The invention relates to turbine flow meters, and particularly to the suspension of the rotor of a turbine flow meter in fluid flow through the meter.

In turbine flow meters it is desirable to suspend the rotor of the meter in fluid flow through the meter in such manner as to minimize friction due to rotation of the rotor produced by such fluid flow. Minimal friction of the rotor in operation increases the accuracy of correlation between rotational speed of the rotor and velocity of fluid flow past the rotor and also increases sensitivity of the rotational speed of the rotor to changes in the velocity of such fluid flow.

It is also desirable in some applications of turbine flow meters that the meter operate equally well for fluid flow in either direction through the meter.

Frictional drag on the rotor of a turbine flow meter when the rotor is rotatably driven by fluid flow through the meter in the result principally of axial thrust loads and radial bearing loads of the rotor on its bearings. Equalizing thrust forces on the rotor eliminates axial thrust loads of the rotor and thus frictional drag on the rotor from this cause. Frictional drag produced by radial bearing loads of the rotor may be reduced by making the rotor as thin as possible in its axial extent to reduce its weight.

The invention comprises apparatus which suspends the rotor of a turbine flow meter in fluid flow through the meter in such manner that thrust loads of the rotor are substantially eliminated and radial bearing loads of the rotor are minimal. The inventive apparatus also effects such results for fluid flow through the meter in either direction and for all phases of fluids, whether liquid, gaseous, or mixed. The inventive apparatus may be utilized in a turbine flow meter of the volumetric type, or it may be utilized in a turbine flow meter of the type which senses the mass rate of fluid flow through the meter from the torsional displacement relative to each other of double rotors having different free running speeds but connected together with a torsion responsive coupling for rotation in unison.

The inventive apparatus includes, broadly, a housing defining a passageway for fluid flow through the housing, a support in the passageway and fixed to the housing, and a rotor disposed in the passageway and mounted on the support for rotation about an axis extending in the direction of fluid flow through the passageway and for free displacement in both directions parallel to its axis of rotation. The rotor has a hub extending a substantial amount radially outwardly from its axis of rotation to constrict the area of the passageway for fluid flow. The rotor also has blades angled relative to its axis of rotation and extending radially outwardly from the hub. Spaced from each axial end of the hub is a shield carried on the support. Each shield extends over the radial extent of the adjacent axial end of the hub, and at least one of the shields and the adjacent axial end of the hub define a chamber surrounding the axis of rotation of the rotor and extending axially thereof. Such shield also defines an internal duct discharging into the chamber and communicating from a point within the passageway which is relatively unconstricted for fluid flow. With this structure, the adjacent peripheral portions of the axial end of the hub and the adjacent shield which define the chamber constitute an annular orifice of variable extent measured in the direction of the axis of rotation of the rotor, the variability of the extent of such orifice resulting from the freedom of the rotor to displace in both directions parallel to its axis of rotation, toward and away from such shield. If fluid flow through the meter is to be in only one direction, the shield defining the chamber is positioned upstream from the rotor and the other shield is positioned downstream from the rotor and may be a solid member. If the meter is to be operable with fluid flow in either direction through the meter, both shields define the above described chamber with the adjacent axial end of the hub of the rotor.

In operation, the net effect of the downstream shield is to produce an upstream thrust force on the rotor. The upstream shield produces a downstream thrust force on the rotor by virtue of fluid pressure created in the chamber defined by such shield and the hub of the rotor. This pressure in the chamber results from the fact that the duct defined by the upstream shield which communicates to the chamber communicates from a point within the fluid flow passageway which is relatively unconstricted for fluid flow and consequently is one of relatively high fluid pressure. The relatively high fluid pressure within the chamber is variable depending upon the axial extent of the annular orifice defined by the adjacent peripheral portions of the hub and the upstream shield, and the greater this orifice the less is the pressure in the chamber. The resultant of the upstream and downstream thrust forces acting on the rotor is the net differential of such forces, which may be characterized as a feed-back thrust force. This feed-back thrust force acts on the rotor in such a manner as to minimize itself due to the fact that when it is an upstream force it tends to close the annular orifice, thereby increasing the pressure within the chamber and consequently the downstream thrust force exerted on the rotor by the pressure within the chamber. When the feed-back thrust force is a downstream force, it tends to increase the extent of the annular orifice and thereby decrease the pressure within the chamber and consequently decrease the downstream thrust force exerted on the rotor by the pressure within the chamber. In this manner, the thrust forces acting on the rotor are self-operative to produce minimal or zero resultant thrust force on the rotor. As a consequence, the rotor floats between the upstream and downstream shields and frictional drag due to axial thrust loads of the rotor is minimal and practically non-existent.

The invention will be fully understood from a reading of the following description in conjunction with the accompanying drawings, in which:

FIG. 1 illustrates an embodiment of the invention for fluid flow in either direction, and FIG. 2 represents an embodiment of the invention for fluid flow in one direction only.

Referring to FIG. 1, the numeral 1 indicates the housing of a turbine flow meter. Housing 1 defines an internal cylindrically shaped passageway 2 for fluid flow through the housing. Fluid flow through housing 1 may be in either direction parallel to the axis of passageway 2 and may be liquid, gaseous, or mixed phase. Housing 1 is threaded at each end in order that it can be connected to conduits for fluid flow in conventional manner with suitable couplings.

Fixed to the housing within passageway 2 is a support 3 comprised of a plurality of thin, spaced streamlined vanes, such as the vanes 4, which are fixed to the housing and extend radially inwardly from the walls of the housing defining passageway 2.

Mounted on support 3 in fixed position is a shield 5 which has fixed to it internal webs 7 mounting a block 6 within the shield. The webs 7 are spaced about block 6 in order to define internal ducts within the shield extending past block 6. Fixedly mounted on block 6 is a shaft 8 which cantilevers from block 6 and extends coaxially with passageway 2 to a second shield 21 spaced from shield 5 in the direction of the axis of passageway 2. Shield 21 includes internal webs 24 and block 25 similar to the corresponding members 7 and 6 described above for shield 5. Shaft 8 is fixed to block 25 and thereby supports shield 21 in fixed position within passageway 2. If desired for greater stability of shield 21, vanes may be connected between housing 1 and shield 21 in the same manner as described above for vanes 4 and shield 5.

A rotor 9 is slidably and rotatably mounted on shaft 8 by means of a sleeve bearing 27. The rotor 9 is thus free to rotate and to displace in both directions parallel to its axis of rotation between shields 5 and 21. Rotor 9 includes a hub 10 which extends radially outwardly from the axis of rotation of the rotor a substantial amount to restrict the area of passageway 2 for fluid flow a substantial amount. Hub 10 is generally cylindrical in shape. Rotor 9 also includes a plurality of blades 12 fixed to hub 10 and extending radially outwardly from the hub to a close clearance from the walls of passageway 2. The blades 12 are symmetrically spaced on the hub about the axis of rotation of rotor 9 and are angled relative to such axis of rotation in order that fluid flow through passageway 2 causes rotor 9 to rotate. Hub 10 has substantially parallel axial ends, and it and bearing 27 are of minimal extent in a direction parallel to the axis of rotation of rotor 9 in order to minimize radial bearing loads between bearing 27 and shaft 8. The axial ends of hub 10 and the adjacent ends of shields 5 and 21 are spaced a predetermined amount from each other in order that rotor 9 is free to move axially on shaft 8 toward and away from each shield.

The end or base of each shield adjacent to an axial end of hub 10 extends over the radial extent of such axial end of the hub and overlaps the outer periphery of the hub to extend radially outwardly beyond the outer periphery of the hub. The area of overlap of the base of the shield beyond the outer periphery of hub 10 is predetermined and is approximately equal to the frontal area presented by blades 12 to fluid flow through passageway 2 in order that the net area for fluid flow through passageway 2 between the ends of shields 5 and 21 past rotor 9 is substantially constant. Each shield 5 and 21 so overlaps the outer periphery of the axial end of the hub adjacent thereto. The end of shield 5 and the adjacent axial end of hub 10 define a chamber surrounding the axis of rotation of the rotor and extending in a direction parallel to such axis, such chamber being illustrated in FIG. 1 as a cylindrical counterbore 11 in the axial end of hub 10 adjacent to the end of shield 5. The outer periphery of the chamber so defined is positioned radially inwardly from the outer periphery of hub 10 in order that the portion 14 of the hub extending radially outwardly from such outer periphery of the chamber defines an annular orifice about the axis of rotation of rotor 9 with the adjacent radially extending portion 13 of the base of shield 5. Due to the freedom of rotor 9 to slide axially on shaft 8, the extent of this orifice measured in a direction parallel to the axis of rotation of rotor 9 is variable, depending on the axial location of rotor 9 relative to the portion 13 of shield 5. It is apparent that the chamber may be defined by other particular structure, such as a conical instead of cylindrical recess, or a recess in the base of shield 5 rather than in the axial end of hub 10.

The shield 5 defines an internal duct 15 discharging through the space between webs 7 into the chamber defined by recess 11. The duct 15 communicates from a point within the passageway which is spaced axially from the rotor and is relatively unconstricted for fluid flow, and hence of high fluid pressure, such point being defined by ports 16 in shield 5 communicating between passageway 2 and duct 15.

The exterior shape of shield 5 converges as it extends away from rotor 9 in a direction parallel to the axis of rotation of the rotor and is conically shaped coaxially with the axis of rotation of rotor 9 with its base adjacent to the rotor. If the fluid flow is to be gaseous, a relatively acute conical exterior surface of shield 5 is preferred, as illustrated in FIG. 1, in order to reduce fluid boundary layer disturbances between the surface of shield 5 and the fluid flow.

If the fluid flow is to be in one direction only through the apparatus illustrated in FIG. 1, shield 5 is positioned upstream of rotor 9 so that the fluid flow moves from right to left in FIG. 1. For this utilization of the apparatus, shield 21 may be solid and need not define internal ducts nor need there be a chamber defined between the end of shield 21 and the adjacent axial end of hub 10. This arrangement is illustrated in FIG. 2 in apparatus having slightly different exterior configuration. The direction of fluid flow through the apparatus illustrated in FIG. 2 is indicated with the arrows 30, and the support 31 including vanes 32 supports a generally conical upstream shield 33 spaced from the upstream end of a rotor 34 similar to rotor 9 described above in connection with FIG. 1. A stub shaft 35, on which rotor 34 is slidably and rotatably mounted, is fixed to shield 33 and extends coaxially with the axis of the passageway defined by the housing downstream to a downstream shield 36 which is generally conical in shape and is solid. The ends of shields 33 and 36 adjacent to the axial ends of rotor 34 are axially spaced therefrom and radially overlap the outer periphery of the hub of rotor 34 in the manner described above for the apparatus illustrated in FIG. 1. The upstream shield 33 defines ducts 37 communicating to a cylindrical recess 38 in the shield which defines a chamber between the end of shield 33 and the adjacent upstream axial end of the hub of rotor 34. As indicated above, this embodiment is operative for fluid flow only in the direction indicated with the arrows 30. However, if the apparatus is to be adapted for fluid flow in either direction through the housing, the apparatus takes the form illustrated in FIG. 1, in which shield 21 is identical with shield 5 and defines an internal duct 23 communicating with passageway 2 through ports 22 and between webs 24 to a chamber defined between the end of shield 21 and the adjacent axial end of hub 10, this chamber being defined by a cylindrical recess 20 in such axial end of the hub. With this arrangement, shield 21 with its internal duct and the chamber defined between its end and the adjacent axial end of hub 10 are all identical with the above described similar features of shield 5 and the chamber defined between its end and the adjacent axial end of hub 10.

Conventional means, indicated at 41 in FIG. 1 and at 42 in FIG. 2, is mounted on the exterior of the housing in the plane of rotation of the blades on the rotor 9 or 34, respectively, for sensing the rotational speed of the rotor. The means 41 and 42 are each completely conventional and may be a variable reluctance pickup.

The operation of the apparatus is substantially described in the introductory portion of the application and needs only enlargement in certain respects. The upstream thrust force produced on the rotor by the downstream shield is, in the case of apparatus for fluid flow in either direction as illustrated in FIG. 1, produced by the high fluid pressure within passageway 2 communicated through ports 22 and internal duct 23 to the chamber defined by recess 20. In the case of apparatus for fluid flow in only one direction, as illustrated in FIG. 2, such upstream force is produced by conversion of kinetic energy of the fluid flow to static pressure at the downstream axial end of rotor 34 as a result of the fluid flow impacting against the portion of the downstream shield 36 overlapping and extending radially beyond the outer periphery of the hub rotor 34. The downstream thrust force on the rotor is produced in the apparatus shown in FIG. 1 by communication of the high fluid pressure through the ports 16 and duct 15 into the chamber defined by recess 11, and in the apparatus shown in FIG. 2 by a similar functioning of the ducts 37 communicating from a point within the passageway of high fluid pressure to the chamber defined by recess 38. Other thrust forces of course act upon the rotor, such as drag forces and thrust forces of the rotor blades. As explained in the introductory portion of this application, the resultant thrust force acting on the rotor or differential of the thrust forces on the rotor, which may be characterized as a feed-back thrust force, acts upon the rotor in such a way as to neutralize itself by varying the annular orifice or orifices between the axial end or ends of the rotor and the adjacent end or ends of the shields to vary the thrust forces exerted upon the rotor in such a manner as to reduce the feed-back thrust force practically to zero.

I claim:

1. A turbine flow meter comprising a housing defining a passageway for fluid flow through the housing, the fluid moving through the meter in a predetermined direction, a support in the passageway and fixed to the housing, a rotor disposed in the passageway, means on the support for mounting the rotor in the passageway for rotation about an axis extending in the direction of fluid flow through the passageway and for free displacement of the rotor in both directions parallel to its axis of rotation, said rotor having a hub extending radially outwardly from its axis of rotation to constrict the passageway and having blades angled relative to its axis of rotation and extending radially outwardly from the hub, a pair of shields spaced from each axial end of the hub and carried on the support, each shield being circular in cross-section and diverging to a maximum diameter at the end adjacent the rotor, the maximum diameter being substantially larger than the diameter of the hub whereby each shield extends over the radial extent of the axial end of the hub adjacent thereto, one of the shields and the adjacent axial end of the hub defining a chamber surrounding the axis of rotation of the rotor and extending axially thereof and such shield also defining an internal duct communicating from a relatively unconstricted point within the passageway and discharging into the chamber, the adjacent peripheral portions of such axial end of the hub and the adjacent shield defining an annular orifice of variable extent measured in the direction of the axis of rotation of the rotor.

2. A turbine flow meter comprising a housing defining a passageway for fluid flow through the housing, a support in the passageway and fixed to the housing, a rotor disposed in the passageway, means on the support for mounting the rotor in the passageway for rotation about an axis extending in the direction of fluid flow through the passageway and for free displacement of the rotor in both directions parallel to its axis of rotation, said rotor having a hub extending radially outwardly from its axis of rotation to constrict the passageway and having blades angled relative to its axis of rotation and extending radially outwardly from the hub, a shield spaced from each axial end of the hub and carried on the support, each shield being circular in cross-section and diverging to a maximum diameter at the end adjacent the rotor, the maximum diameter being substantially larger than the diameter of the hub so that both shields extend radially outwardly beyond the outer periphery of such axial end of the hub, one of the shields and the adjacent axial end of the hub defining a chamber surrounding the axis of rotation of the rotor and extending axially thereof and such shield also defining an internal duct communicating from a relatively unconstricted point within the passageway and discharging into the chamber, the adjacent peripheral portions of such axial end of the hub and the adjacent shield defining an annular orifice of variable extent measured in the direction of the axis of rotation of the rotor.

3. Apparatus in accordance with claim 2 wherein each shield extends away from the rotor in the direction of the axis of the rotor and has an exterior surface which converges as it extends away from the rotor.

4. Apparatus in accordance with claim 2 wherein each shield is substantially conically shaped coaxially with the axis of the rotor with its base adjacent the hub of the rotor, and the means for mounting the rotor in the passageway includes a shaft extending between the shields on which the rotor is rotatably and slidably mounted.

5. A turbine flow meter comprising a housing defining a passageway for fluid flow through the housing, a support in the passageway having an inlet end and an outlet end and fixed to the housing, a rotor disposed in the passageway, means on the support for mounting the rotor in the passageway for rotation about an axis extending in the direction of fluid flow through the passageway and for free displacement of the rotor in both directions parallel to its axis of rotation, said rotor having a generally cylindrical, axially thin hub extending radially outwardly from its axis of rotation to constrict the passageway a substantial amount and having blades angled relative to its axis of rotation and extending radially outwardly from the hub, a pair of shields spaced from each axial end of the hub and carried on the support in fixed position, each shield being circular in cross-section and diverging to a maximum diameter at the end adjacent the rotor, the maximum diameter being substantially larger than the diameter of the hub so that both shields extend radially outwardly beyond the outer periphery of such axial end of the hub, the shield nearest the inlet end and the adjacent axial end of the hub defining a substantially circular chamber surrounding the axis of rotation of the rotor and extending axially thereof with the outer periphery of the chamber located radially inwardly from the outer periphery of such axial end of the hub and such shield also defining an internal duct communicating from a relatively unconstricted point within the passageway spaced axially from the rotor and discharging into the chamber, the adjacent peripheral portions of such axial end of the hub and the adjacent shield located radially outwardly from the outer periphery of the chamber defining an annular orifice of variable extent measured in the direction of the axis of rotation of the rotor.

6. A fluid flow meter comprising a housing defining a fluid passageway having an inlet end and an outlet, a pair of fixed shields mounted in the passageway, the shields converging toward each other, the shields having spaced apart opposing surfaces at their adjacent ends, a rotor having a substantially cylindrical hub portion, means for rotatably supporting the rotor in the space between the adjacent ends of the shields, the rotor turning about an axis parallel to the direction of flow through the passageway and being free to move along said axis within the limits of the space between the shields, the opposing surfaces of the shields projecting radially substantially beyond the hub portion of the rotor whereby fluid flowing over the hub surface impinges on the portion of downstream shield surface projecting radially outwardly of the hub, the rotor hub and shield nearest the inlet end of the housing being shaped to form an annular chamber having a restricted opening at the outer periphery of the hub, the shield having a fluid passage communicating between the inlet end of the housing and said chamber for admitting fluid to the chamber and out through the restricted opening between the hub and the shield.

References Cited by the Examiner

UNITED STATES PATENTS

| | | | |
|---|---|---|---|
| 2,683,224 | 7/1954 | Cole | 73—231 X |
| 2,709,366 | 5/1955 | Potter | 73—231 |
| 2,709,755 | 5/1955 | Potter | 73—231 X |
| 2,812,661 | 11/1957 | Cox | 73—231 |

RICHARD C. QUEISSER, *Primary Examiner.*

ROBERT L. EVANS, JOSEPH P. STRIZAK,
*Examiners.*